US006340162B1

(12) United States Patent
Hobaugh, II

(10) Patent No.: US 6,340,162 B1
(45) Date of Patent: Jan. 22, 2002

(54) SEAL FOR INTEGRAL POWER STEERING GEAR

(75) Inventor: James Martin Hobaugh, II, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/373,670

(22) Filed: Aug. 13, 1999

(51) Int. Cl.$^7$ ............................. F16L 17/03; F02F 11/00
(52) U.S. Cl. ...................... 277/594; 277/598; 277/609; 277/626; 277/647
(58) Field of Search ................................. 277/594, 598, 277/630, 641, 647, 649, 650, 609, 612, 616, 626, 593, 567

(56) References Cited

U.S. PATENT DOCUMENTS

| | | | | |
|---|---|---|---|---|
| 3,137,509 | A | * | 6/1964 | Kazienko ..................... 277/626 |
| 3,302,953 | A | * | 2/1967 | Glasgow ...................... 277/611 |
| 3,355,181 | A | * | 11/1967 | Olson .......................... 277/611 |
| 4,280,654 | A | * | 7/1981 | Sliger ........................ 236/34.6 |
| 4,348,032 | A | * | 9/1982 | Hanson et al. ............... 277/594 |
| 5,518,257 | A | * | 5/1996 | Breaker ....................... 277/612 |
| 5,562,017 | A | | 10/1996 | Wuenscher |
| 6,042,121 | A | * | 3/2000 | Ma et al. ..................... 277/608 |

* cited by examiner

Primary Examiner—Anthony Knight
Assistant Examiner—Alison K. Pickard
(74) Attorney, Agent, or Firm—Tarolli, Sundheim, Covell, Tummino & Szabo, L.L.P.

(57) ABSTRACT

A seal (10) is for use in a hydraulic apparatus such as a power steering gear (12) having first and second parts (14, 40) that are fastened to each other and that have facing major side surfaces (24, 42) that include aligned fluid pressurized openings (28, 48). The seal (10) has generally planar inner and outer major side surfaces (50, 60) and a seal opening (64) extending therebetween that is aligned with the openings (28, 48) in the first and second parts (14, 40) when the second part is secured to the first part with the seal clamped between them. The seal (10) has an annular edge portion (70) extending around and defining the opening (64) in the seal. The edge portion (70) has a free condition in which annular lip portions (86, 76) of the seal edge portion project from the planes of the inner and outer major side surfaces (50, 60) of the seal. The seal edge portion (70) has a clamped condition when clamped between the first and second parts (14, 40) in which the lip portions (86, 76) are disposed between the planes of the inner and outer major side surfaces (50, 60) of the seal (10). The lip portions (86, 76) when in the clamped condition define an annular groove (104) extending around the edge portion (70). The groove (104) receives fluid pressure to act on the lip portions (86, 76) to urge the lip portions into sealing engagement with the first part (14) and with the second part (40).

10 Claims, 2 Drawing Sheets

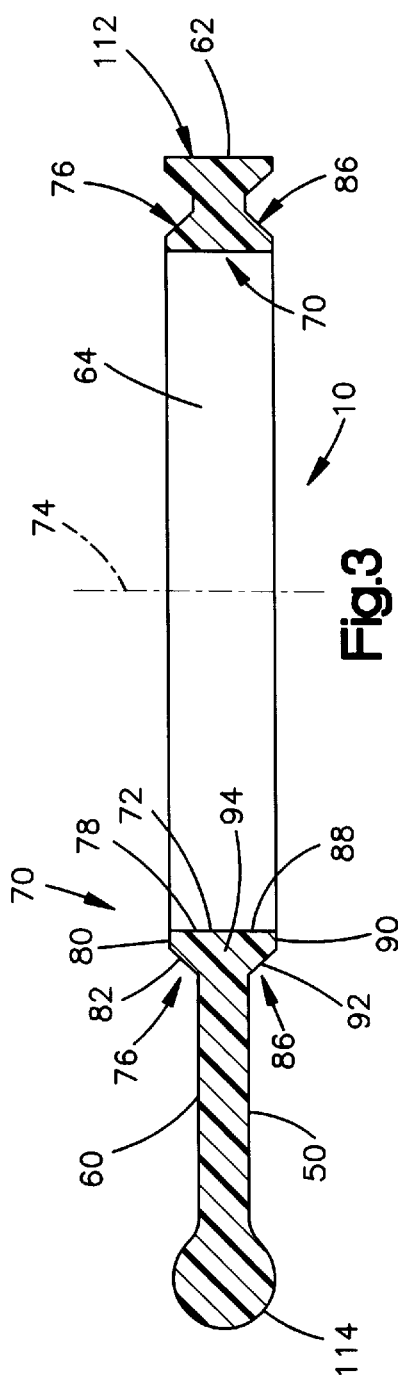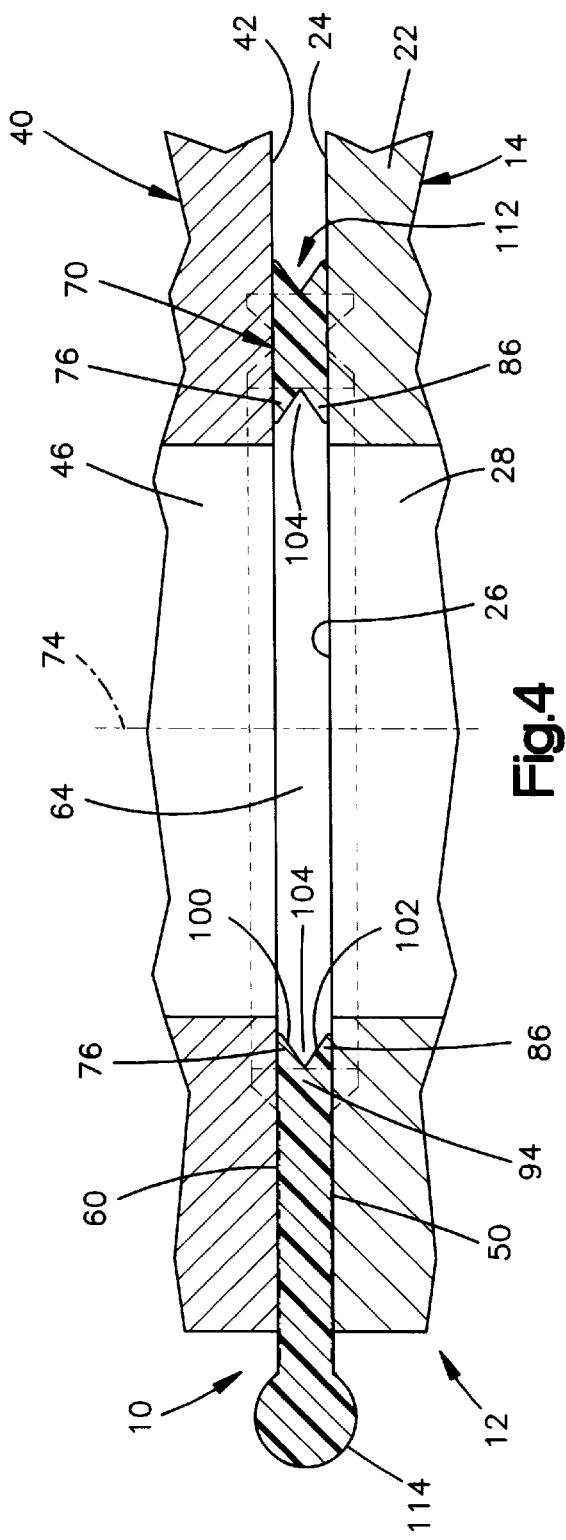

SEAL FOR INTEGRAL POWER STEERING GEAR

BACKGROUND OF THE INVENTION

1. Technical Field

The present invention relates to a seal and, in particular, to a seal for use in a hydraulic apparatus, such as an integral power steering gear.

2. Description of the Prior Art

A known integral power steering gear includes a housing containing fluid under pressure. A side cover closes an opening in the housing. A seal is disposed between and seals between the side cover and the housing. The seal is made from rubber that is molded on a metal stamping.

SUMMARY OF THE INVENTION

The present invention is a seal for use in a hydraulic apparatus, the hydraulic apparatus having first and second parts that are fastened to each other and that have facing major side surfaces that include aligned fluid pressurized openings. The seal seals between the major side surfaces of the first and second parts. The seal has generally planar inner and outer major side surfaces and a seal opening extending therebetween that is aligned with the openings in the first and second parts when the second part is secured to the first part with the seal clamped between them. The seal has an annular edge portion extending around and defining the opening in the seal. The edge portion has a free condition in which annular lip portions of the seal edge portion project from the planes of the inner and outer major side surfaces of the seal. The seal edge portion has a clamped condition when clamped between the first and second parts in which the lip portions are disposed between the planes of the inner and outer major side surfaces of the seal. The lip portions when in the clamped condition define an annular groove extending around the edge portion. The groove receives fluid pressure to act on the lip portions to urge the lip portions into sealing engagement with the first part and with the second part.

BRIEF DESCRIPTION OF THE DRAWINGS

Further features of the present invention will become apparent to those skilled in the art to which the present invention relates from reading the following specification with reference to the accompanying drawings, in which:

FIG. 3 is a sectional view taken generally along line 3—3 of FIG. 2, showing the seal in a free condition; and FIG. 4 is a view similar to FIG. 3 showing the seal in an assembled condition in the power steering gear of FIG. 1.

DESCRIPTION OF A PREFERRED EMBODIMENT

Figure 1:
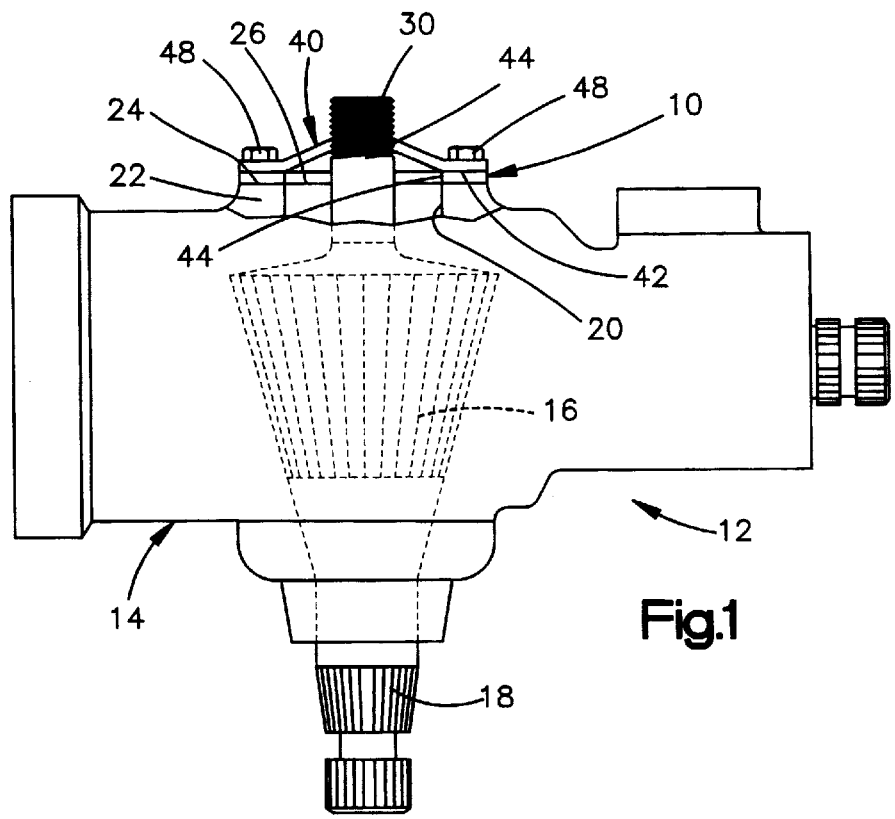
FIG. 1 is an exterior view of an integral power steering gear including a seal in accordance with the present invention.

The present invention relates to a seal and, in particular, to a seal for use in a hydraulic apparatus. As representative of the present invention, FIG. 1 illustrates a seal 10 included in an integral power steering gear 12. The steering gear 12 is of a known type, for example as shown in U.S. Pat. No. 5,562,017, and includes a metal housing 14 in which are located the working parts (most of which are not shown) of the steering gear.

The working parts of the steering gear 12 include a piston movable in the housing 14 under the influence of fluid under pressure in the housing. The outer periphery of the piston includes a plurality of gear teeth that mesh with gear teeth on a sector gear shown schematically at 16. Movement of the piston causes the sector gear 16 to rotate about an axis. The sector gear is on a portion of an output shaft 18 which extends outwardly from the housing 14. The output shaft 18 is connected to a pitman arm (not shown) which in turn is connected to a mechanical steering linkage of the vehicle. Thus, as the piston moves in the housing 14, the sector gear 16 and the output shaft 18 are rotated to operate the steering linkage in a manner known in the art.

The housing 14 has a relatively large side passage 20. The portion 22 of the housing 14 defining the passage 20 has a planar outer major side surface 24. The passage 20 terminates in a central opening 26 in the outer side surface 24. The housing 14 also has a plurality of bolt holes disposed in an array around the central opening 26. The plurality of bolt holes includes two pressurized bolt holes 28 (only one of which is shown, in FIG. 4) and four non-pressurized bolt holes (not shown).

The steering gear 12 includes a side cover 40 for closing the opening 26 in the housing 14. The side cover 40 has a planar inner major side surface 42 that is presented inward, that is, toward the housing 14. The inner side surface 42 of the side cover 40 is adjacent to and parallel to the outer side surface 24 of the housing 14.

The steering gear 12 includes an adjusting screw 30 (FIG. 1) for adjusting the lash of the sector gear 16. The adjusting screw 30 extends outward from the passage 20 in the housing 14.

The side cover 40 has a central opening 44 in which the adjusting screw 30 is threaded. The side cover 40 also has a plurality of bolt holes disposed in an array extending around the opening 44. The plurality of bolt holes includes two pressurized bolt holes 46 (only one of which is shown, in FIG. 4) and four non-pressurized bolt holes (not shown). The central opening 44 and the bolt holes in the side cover 40 align with the central opening 26 and the bolt holes in the housing 14, when the parts are secured together.

A plurality of bolts 48 (FIG. 1) extend through the bolt holes in the side cover 40 and into the bolt holes in the housing 14. The bolts 48 secure the side cover 40 to the housing 14.

The seal 10 is disposed between the side cover 40 and the housing 14. The seal 10 is made from a single piece of injection molded plastic material. A preferred material is Victrex brand polyethersulfone (PES) made by Victrex Manufacturing Limited of England. An alternative material is PEEK.

The seal 10 has a generally planar inner major side surface 50 for sealing engagement with the outer major side surface 24 of the housing 14. The seal has an opposite, generally planar outer major side surface 60 for sealing engagement with the inner major side surface 42 of the side cover 40.

Figure 2:
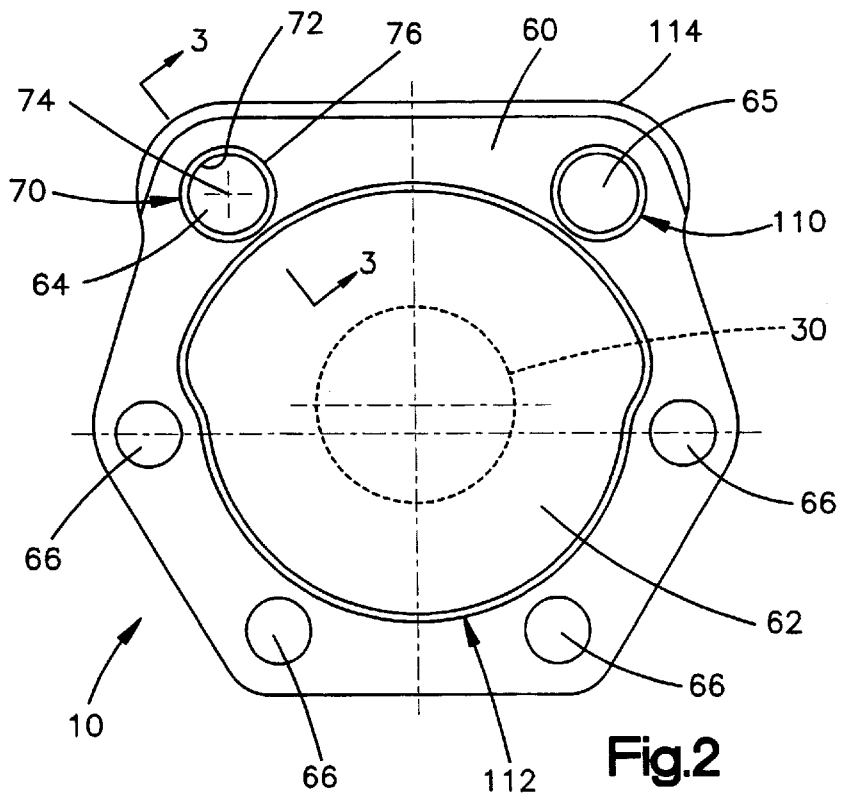
FIG. 2 is a plan view of the seal of FIG. 1.

The seal 10 has a plurality of openings extending between its inner and outer side surfaces 50 and 60. The openings include a central opening 62 through which the adjusting screw 30 extends. The openings in the seal 10 also include two pressurized bolt hole openings 64 and 65 (FIG. 2), and four non-pressurized bolt hole openings 66.

The central opening 62 and the bolt holes 64-66 in the seal 10 align with the central opening 20 and bolt holes in the housing 14, and with the central opening 42 and bolt holes in the side cover 40, when the parts are secured together.

The seal 10 has an edge portion 70 (FIGS. 2–4) extending around and defining the bolt hole opening 64 in the seal. The edge portion 70 has a first configuration when the seal 10 is in a free condition, as illustrated in FIG. 3. The edge portion 70 has a second or deformed configuration, different from the first configuration, when the seal 10 is in a clamped condition between the side cover 40 and the housing 14, as illustrated in FIG. 4.

When the seal edge portion 70 is in the free condition (FIG. 3) it has a cylindrical inner surface 72 defining the opening 64. The cylindrical surface 72 extends parallel to an axis 74 of the opening.

The seal edge portion 70 when in the free condition has a first portion or first lip 76 projecting axially outward (upward as viewed in FIG. 3) from the plane of the outer major side surface 60 of the seal 10. The first lip 76 has a cylindrical inner edge surface 78 that forms a part of the cylindrical inner surface 72. An annular surface 80 on the first lip 76 extends radially outward from the cylindrical surface 78. A frustoconical surface 82 on the first lip 76 extends radially outward from the annular surface 80 and axially back to the outer major side surface 60.

The seal edge portion 70 when in the free condition has a second lip 86 or second portion projecting axially inward (downward as viewed in FIG. 3) from the plane of the inner major side surface 50 of the seal 10. The second lip 86 is a mirror image of the first lip 76. The second lip 86 has a cylindrical inner edge surface 88 that forms a part of the cylindrical inner surface 72. An annular surface 90 on the second lip 86 extends radially outward from the cylindrical surface 88. A frustoconical surface 92 on the second lip 86 extends radially outward from the annular surface 90 and axially back to the inner major side surface 50.

The seal edge portion includes a base portion 94 lying between the planes of the inner and outer major side surfaces 50 and 60. The base portion 94 has substantially the same configuration both when the seal edge portion 70 is in the free condition and in the clamping condition. The annular lip portions 76 and 86 of the seal edge portion 70 project from the base portion 94. The cylindrical surface 72 extends across the base portion 94 and the inner and outer lip portions 86 and 76.

When the seal edge portion 70 is in the second or deformed configuration (FIG. 4), the first lip 76 is engaged by the inner side surface 42 of the side cover 40. The first lip 76 is deformed or forced into a location between the plane of the outer major side surface 60 of the seal 10 and the plane of the inner major side surface 50 of the seal. Simultaneously, the second lip 86 is engaged by the outer side surface 24 of the housing 40. The second lip 86 is deformed or forced toward the first lip 76, into a location between the plane of the outer major side surface 60 of the seal 10 and the plane of the inner major side surface 50 of the seal.

When the edge portion 70 of the seal 10 is thus deformed, the lip portions 76 and 86 are forced radially inward toward the axis 74 and have facing surfaces 100 and 102, respectively. The surface 100 on the first lip 76 faces radially and axially inward. The surface 102 on the second lip 86 faces radially inward and axially outward. The surfaces 100 and 102 define an annular, generally V-shaped groove 104 in the seal edge portion 76. The first and second lips 76 and 86, and the groove 104, are disposed between the inner major side surface 42 of the side cover 40, and the outer major side surface 24 of the housing 14.

The facing surfaces 100 and 102 on the lips 76 and 86 are exposed to the pressure of the fluid in the groove 104. The fluid pressure acts on the surface 100 to urge the first lip 76 axially outward into sealing engagement with the inner major side surface 42 of the side cover 40. The fluid pressure acts on the surface 102 to urge the second lip 86 axially inward, into sealing engagement with the outer major side surface 24 of the housing 14. The seal 10 thus effects a fluid-tight seal between the inner major side surface 42 of the side cover 40 and the outer major side surface 24 of the housing 14.

The edge portion 76 of the seal 10 is illustrative of the edge portions on the seal 10 that encircle pressurized openings in the seal. Thus, the seal 10 has a similar deformable edge portion 110 extending around the other pressurized bolt hole opening 65. The seal 10 also has a similar deformable edge portion 112 (part of which is visible in FIGS. 3 and 4) extending around the central opening 62 in the seal 10. The seal 10 also includes a raised bead portion 114 disposed outwardly of the housing 14 and side cover 40, for strain relief.

Because the seal 10 is made completely from a moldable material, the seal can be molded to whatever shape is most desirable for the particular sealing application. The seal 10 can be molded without the use of a collapsible core mold, and the core can be pulled straight out after molding.

From the above description of the invention, those skilled in the art will perceive improvements, changes and modifications in the invention. For example, the seal of the present invention can be used in other types of hydraulic apparatus, such as a power steering pump, a hydraulic motor, or other types of apparatus having a need for sealing between the faces of adjoining parts. Such improvements, changes and modifications within the skill of the art are intended to be covered by the appended claims.

Having described the invention, I claim:

1. A seal for use in a hydraulic apparatus, the hydraulic apparatus having first and second parts fastened to each other, the first and second parts having facing major side surfaces that include aligned fluid pressurized openings, said seal for sealing between the major side surfaces of the first and second parts;

said seal having generally planar inner and outer major side surfaces and a seal opening extending therebetween that is aligned with the openings in the first and second parts when the second part is secured to the first part with the seal clamped between them;

said seal having an annular edge portion extending around and defining said opening in said seal, said edge portion having a free condition in which annular lip portions of said seal edge portion project from the planes of said inner and outer major side surfaces of said seal;

said seal edge portion having a clamped condition when clamped between the first and second parts in which said lip portions are disposed between the planes of said inner and outer major side surfaces of said seal;

said lip portions when in the clamped condition defining an annular groove extending around said edge portion, said annular groove being configured to receive fluid pressure to act on said lip portions to urge said lip portions into sealing engagement with the first part and with the second part;

said lip portions when in the free condition having cylindrical inner surfaces which in the clamped condition define said annular groove which receives fluid pressure, said lip portions further including an inner lip portion for engagement with the first part and an outer lip portion for engagement with the second part, said inner lip portion, when in the free condition, having a cylindrical inner surface, an annular surface that extends radially outward from said cylindrical surface, and a frustoconical surface that extends radially outward from said annular surface and axially to said inner major side surface of said seal.

2. A seal as set forth in claim 1 wherein said outer lip portion of said seal edge portion when in the free condition has a cylindrical inner surface, an annular surface that extends radially outward from said cylindrical surface, and a frustoconical surface that extends radially outward from said annular surface and axially to said outer major side surface of said seal.

3. A seal for use in a hydraulic apparatus, the hydraulic apparatus having first and second parts fastened to each other, the first and second parts having facing major side surfaces that include aligned fluid pressurized openings, said seal for sealing between the major side surfaces of the first and second parts;

said seal having generally planar inner and outer major side surfaces and first and second seal openings extending therebetween that are aligned with corresponding openings in the first and second parts when the second part is secured to the first part with the seal clamped between them;

said seal having a first annular edge portion extending around and defining said first opening in said seal and a second annular edge portion extending around and defining said second opening in said seal, said first and second edge portions each having a free condition in which annular lip portions of said first and second seal edge portions project from the planes of said inner and outer major side surfaces of said seal;

said first and second edge portions each having a clamped condition when clamped between the first and second parts in which said lip portions are disposed between the planes of said inner and outer major side surfaces of said seal;

said lip portions when in the clamped condition defining first and second annular grooves extending around said first and second edge portions, respectively, said first and second annular grooves being configured to receive fluid pressure to act on said lip portions to urge said lip portions into sealing engagement with the first part and with the second part said lip portions when in the free condition having cylindrical inner surfaces which in the clamped condition define said first and second annular grooves which receive fluid pressure.

4. A seal as set forth in claim 3 wherein said lip portions of said seal edge portion include an inner lip portion for engagement with the first part and an outer lip portion for engagement with the second part.

5. A seal as set forth in claim 3 wherein each of said first and second edge portions include a base portion lying between the planes of said inner and outer major side surfaces of said seal, said base portion having substantially the same configuration both when said first and second edge portions are in the free condition and in the clamping condition;

said annular lip portions of said first and second edge portions projecting from said base portion and including an inner lip portion for engagement with the first part and an outer lip portion for engagement with the second part;

said first and second edge portions when in the free condition having an annular first surface with a generally cylindrical configuration that extends across said base portion and said inner and outer lip portions;

said annular first surface when in the clamped condition being deformed into a generally V-shaped configuration and defining said annular groove.

6. A seal as set forth in claim 5 wherein:

said inner annular lip portion has a second surface extending away from said first surface and merging with inner major side surface of said seal, said outer annular lip portion has a third surface extending away from said first surface and merging with outer major side surface of said seal, said second and third surfaces being in engagement with said first and second parts, respectively, when said seal is in the clamped condition.

7. A seal as set forth in claim 3 wherein said seal comprises a plastic body, said planar inner and outer major side surfaces being on said plastic body, and said lip portions being portion of said plastic body.

8. A hydraulic apparatus for a vehicle steering gear, said apparatus comprising:

a side cover;

a housing to which said side cover is secured; and a seal for sealing between said side cover and said housing, said housing having an outer major side surface, said housing also having a fluid pressurized opening in said outer major side surface of said housing;

said side cover having an inner major side surface outward of and in closely opposed relation to said outer major side surface of said housing, said side cover also having an opening in its inner major side surface that is aligned with said opening in said housing when said side cover is secured to said housing;

said seal sealing between said outer major side surface of said housing and said inner major side surface of said side cover;

said seal having a generally planar inner major side surface for sealing engagement with the outer major side surface of said housing, said seal having a generally planar outer major side surface for sealing engagement with said inner major side surface of said side cover;

said seal also having at least one seal opening extending between its inner and outer major side surfaces, said at least one seal opening being aligned with said opening in said housing and with said opening in said side cover when said side cover is secured to said housing by a bolt in said openings with said seal disposed between said side cover and said housing;

said seal having an edge portion extending around and defining said opening in said seal, said edge portion having a first configuration when said seal is in a free condition and said edge portion having a second configuration, different from said first configuration, when said seal is secured in a clamped condition between said side cover and said housing;

said seal edge portion when in the free condition having a first portion projecting outward from the plane of said outer major side surface of said seal and having a second portion projecting inward from the plane of said inner major side surface of said seal;

said first and second portions of said seal edge portion, when in the free condition, having cylindrical inner surfaces, said cylindrical inner surfaces, when in the clamped condition, becoming facing surfaces which are exposed to fluid pressure in said fluid pressurized opening in said housing, fluid pressure acting on said facing surfaces to urge said first portion of said seal edge portion into sealing engagement with said inner major side surface of said side cover and to urge said second portion of said seal edge portion into sealing engagement with said outer major side surface of said housing.

9. A hydraulic apparatus as set forth in claim 8 wherein said facing surfaces define a groove having a generally V-shaped configuration.

10. A hydraulic apparatus as set forth in claim 8 wherein said seal comprises a plastic body, said planar inner and outer major side surfaces being on said plastic body, and said seal further comprising lip portions of said seal edge portion that are a portion of said plastic body.

* * * * *